United States Patent
Barnes et al.

(10) Patent No.: US 11,066,507 B2
(45) Date of Patent: Jul. 20, 2021

(54) SOLID CYANOACRYLATE COMPOSITIONS

(71) Applicant: Henkel IP & Holding GmbH, Duesseldorf (DE)

(72) Inventors: Rory B. Barnes, Lucan (IE); Rachel Hersee, Drimnagh (IE); Raymond P. Tully, Slane (IE); Mark Loane, Naas (IE); Ruth A. Kelly, Clonee (IE)

(73) Assignee: Henkel IP & Holding GmbH, Duesseldorf (DE)

( * ) Notice: Subject to any disclaimer, the term of this patent is extended or adjusted under 35 U.S.C. 154(b) by 0 days.

(21) Appl. No.: 16/841,530

(22) Filed: Apr. 6, 2020

(65) Prior Publication Data

US 2020/0231736 A1    Jul. 23, 2020

Related U.S. Application Data

(63) Continuation of application No. PCT/EP2018/076750, filed on Oct. 2, 2018.

(30) Foreign Application Priority Data

Oct. 6, 2017 (GB) ...................................... 1716414

(51) Int. Cl.
| | |
|---|---|
| *C09J 4/06* | (2006.01) |
| *C09J 175/06* | (2006.01) |
| *C08G 18/34* | (2006.01) |
| *B29C 39/00* | (2006.01) |
| *B29C 39/02* | (2006.01) |
| *C08F 20/42* | (2006.01) |
| *C08G 18/32* | (2006.01) |
| *C09J 151/00* | (2006.01) |
| *C09J 175/04* | (2006.01) |
| *B29K 33/18* | (2006.01) |
| *B29K 75/00* | (2006.01) |
| *C08K 3/30* | (2006.01) |
| *C08K 3/38* | (2006.01) |

(52) U.S. Cl.
CPC .......... *C08G 18/341* (2013.01); *B29C 39/006* (2013.01); *B29C 39/02* (2013.01); *C08F 20/42* (2013.01); *C08G 18/3203* (2013.01); *C09J 4/06* (2013.01); *C09J 151/00* (2013.01); *C09J 175/04* (2013.01); *C09J 175/06* (2013.01); *B29K 2033/18* (2013.01); *B29K 2075/00* (2013.01); *C08K 3/30* (2013.01); *C08K 3/38* (2013.01)

(58) Field of Classification Search
CPC . C09J 4/06; C09J 151/00; C09J 175/04; C09J 175/06
See application file for complete search history.

(56) References Cited

U.S. PATENT DOCUMENTS

| | | |
|---|---|---|
| 3,846,363 A | 11/1974 | Ando et al. |
| 4,639,475 A | 1/1987 | Dierich et al. |

(Continued)

FOREIGN PATENT DOCUMENTS

| | | |
|---|---|---|
| DE | 19957677 A1 | 6/2000 |
| JP | 51-103939 | 9/1976 |

(Continued)

*Primary Examiner* — Michael L Leonard
(74) *Attorney, Agent, or Firm* — Steven C. Bauman (57) ABSTRACT

A cyanoacrylate composition with thermoplastic polyurethane, formulated as a non-flowable soft solid or semi solid mass, for example in stick form, is reported.

15 Claims, 6 Drawing Sheets

Tensile shear of Ethyl Cyanoacrylate compositions in both liquid and solid format (56) References Cited

U.S. PATENT DOCUMENTS

| | | |
|---|---|---|
| 5,371,131 A | 12/1994 | Gierenz et al. |
| 5,433,775 A | 7/1995 | Gardenier et al. |
| 5,776,406 A * | 7/1998 | Schubert ............ B29C 45/0001 |
| | | 264/328.1 |
| 5,869,593 A | 2/1999 | Helmeke et al. |
| 2007/0092481 A1* | 4/2007 | Misiak .................. C08K 5/315 |
| | | 424/78.27 |
| 2011/0170939 A1 | 7/2011 | Attarwala |

FOREIGN PATENT DOCUMENTS

| | | |
|---|---|---|
| JP | 2011057733 A | 3/2011 |
| WO | 2007049258 A1 | 5/2007 |

* cited by examiner

SOLID CYANOACRYLATE COMPOSITIONS

BACKGROUND

Field

The present invention relates to curable cyanoacrylate compositions that are non-flowable at room temperature (25° C.) and that are suitable for use as adhesives compositions, such as for example in a solid or semi-solid form such as a stick-form.

Brief Description of Related Technology

Traditional cyanoacrylate adhesives materials are acid-stabilized, single component (monomers) fluid liquid-form adhesives that react rapidly at room temperature (25° C.) when contacted with moisture (a weak base), and are particularly suited for use between tight bond lines. Solid-form compositions that are based on conventional room-temperature (25° C.) liquid-form cyanoacrylate monomers—such as for example β-methoxy cyanoacrylate, butyl cyanoacrylate or ethyl cyanoacrylate (also known as ethyl 2-cyanopropenoate)—are highly desirable for a range of industrial and commercial applications. For example, one such industrial/commercial application would be in adhesives compositions suitable for use in in hand-held devices and displays.

Cyanoacrylate monomers that are solid at room-temperature are known, such as phenylethyl cyanoacrylate, ethylhexyl cyanoacrylate, and hexadecyl cyanoacrylate. Such room-temperature solid cyanoacrylate monomers can be used to prepare stick-form and tape-form cyanoacrylate products. However compositions based on these monomers perform poorly relative to compositions comprising conventional room-temperature liquid-form cyanoacrylate monomers, over a range of metrics. And solid cyanoacrylate monomers are typically non-standard specialty chemicals that are costly and difficult to synthesise.

Additives have been used in the past to toughen liquid-form cyanoacrylate compositions and impart solidity to the compositions at room-temperature. However, it is challenging to identify suitable additives that are soluble in liquid-form cyanoacrylate monomers, that do not react with the cyanoacrylate monomers, and that also result in stable solid form compositions when added to the cyanoacrylate monomers.

It is known that the addition of fumed silica can impart thixotropic behaviour and increased viscosity to curable liquid cyanoacrylate compositions; however, above a certain amount, the fumed silica precipitates, and thus, fumed silica if used alone is unsuitable for the formation of, for example, solid stick-form curable cyanoacrylate compositions. It is well known for instance to formulate adhesives as "stick" compositions. The patent literature on stick adhesives is extensive and covers a broad range of adhesive types, from emulsion adhesives through solvent based adhesives, to contact adhesives as well as gelling and solidifying additives for the preparation of the sticks ranging from thermosetting through natural polymers to inert fillers. A well-known example of one such adhesive stick is that sold under the trade name PrittStick® by Henkel AG & Co. KGaA which is an emulsion-based adhesive.

It is known that substances termed 'stabilisers' can be added to compositions comprising curable cyanoacrylate components, to stabilise the reactive cyanoacrylate-based monomers, inhibiting premature polymerisation. There are many such stabilisers known in the art; for example Lewis acids, such as boron trifluoride ($BF_3$), or stabilisers such as sulfur dioxide ($SO_2$).

In the patent literature the following patents typify adhesive components which have been formulated as soft-solids, and more particularly sticks. U.S. Pat. No. 5,433,775 discloses an adhesive stick consisting of a water based preparation of starch derivatives and a soap gel as the shaping gel-forming component. See also U.S. Pat. No. 5,371,131. U.S. Pat. No. 3,846,363 relates to an adhesive crayon composition containing a sorbitol-benzaldehyde reaction product as an additive. U.S. Pat. No. 4,639,475 discloses an adhesive stick composed of the reaction product of sorbitol and/or xylitol and benzaldehyde as the gel-forming composition together with an adhesive resin which is the reaction product of methyl vinyl ether/maleic acid anhydride copolymers with partially neutralised acid phosphate esters of non-ionic wetting agents of the lower alkylene oxide adduct type. Japanese patent application (Kokai) 51-103939 describes a stick-like epoxy adhesive and a stick-like epoxy hardening agent which is used therewith. The sticks disclosed in the JP '939 patent document appear to be obtained by suitably compounding gelling agent or/and water and/or organic solvent with liquid or solution type epoxy adhesive and epoxy hardening agent. WO2007/049258A1 to Henkel relates to thickened cyanoacrylate compositions in non-flowable or gel form, packaged in pocket-sized applicator dispensers for use, wherein the compositions comprise a polymer material constructed from poly(ethylene glycol) and poly(butylene terephthalate) sections. DE19957677 to Henkel describes a cyanoacrylate adhesive, coating or sealing material which also contains at least one condensation product of an aldehyde or ketone with a polyol.

Henkel Corporation has a line of adhesive products in the form of a stick. Members of that product line include for example, LOCTITE 248, 268, 668, 548, 526 and PST 561 ('LOCTITE' is a registered trademark). Absent from this product line is a stick-product based on cyanoacrylate. One reason for this is that cyanoacrylates are notoriously sensitive to premature polymerisation or destabilisation, which is because of their intrinsic reactivity. Accordingly, it is challenging to identify a suitable additive capable of imparting solidity at 25° C., without destabilising the cyanoacrylate or adversely impacting the shear strength of the composition.

SUMMARY

In one aspect, the present invention provides a curable composition comprising:
(i) a cyanoacrylate component; and
(ii) a thermoplastic polyurethane (TPU) component
wherein the TPU component (ii) has a mass average molar mass Mw from about 5000 to about 250000, such as from about 6000 to about 200000, suitably from about 10000 to about 150000,
and wherein said TPU component (ii) is soluble at a temperature of 65° C. in the cyanoacrylate component up to at least 40 wt % by weight based on the total weight of the cyanoacrylate component,
and wherein said TPU component (ii) is based on a polyol that is based on at least one of a diol or a dicarboxylic acid characterised in that at least one of said diol or dicarboxylic acid has greater than 10 carbon atoms ($>C_{10}$) in the main chain, and wherein the TPU component (ii) has a glass transition temperature of from about −60° C. to about 0° C., and a melting point of from about 30° C. to about 100° C. as measured by differential scanning calorimetry in accordance with ISO11357,
and wherein the TPU component (ii) is present in the curable composition in an amount from about 1 wt % to about 60 wt %, wherein the weight percentages are based on the total weight of the composition, and wherein the curable cyanoacrylate component (i) is selected from the group comprising ethyl cyanoacrylate, butyl cyanoacrylate, and β-methoxy cyanoacrylate, and wherein the curable composition is solidified in a desired geometric form, for example stick-form, particularly a cylindrically shaped stick.

The compositions of the invention are non-flowable at room temperature (25° C.) and are suitable for use as adhesives compositions, such as for example in a solid or semi-solid form such as a stick-form. With such compositions they can be applied by rubbing the composition against any substrate to which it is applied. Firstly the composition has sufficient integrity to remain in the shaped mass it is formed in. This allows it to be easily handled, for example without dripping or disintegrating. Secondly the composition has a shear strength which allows it to be applied by rubbing a shaped mass of it against a substrate. Rubbing causes some of the composition to break away from the shaped mass thus facilitating application to a substrate.

The TPU component (ii) may be present in the curable composition in an amount from about 5 wt % to about 40 wt %, for example from about 10 wt % to about 30 wt %, wherein the weight percentages are based on the total weight of the composition.

Desirably the TPU component (ii) has a glass transition temperature, Tg, of from about −60° C. to about −5° C., such as from about −50° C. to about −10° C.

Suitably the TPU component (ii) has a glass transition temperature, Tg, in the range of from about −55° C. to about −20° C., such as from about −50° C. to about −30° C.

In a curable composition of the invention it is desirable that the TPU component (ii) comprises polyester segments.

In a curable composition of the invention it is desirable that the TPU component (ii) comprises polyester segments, where the polyester segments are based on at least one of a greater than $C_{10}$ diol or a greater than $C_{10}$ dicarboxylic acid. It has been found that such TPUs give very desirable handling properties to the composition.

The TPU component (ii) may be based on a polyester polyol formed from 1,6-hexane diol and a greater than $C_{10}$ dicarboxylic acid. For example the TPU component (ii) may be based on a (co)polyester of dodecanedioic acid and 1,6-hexanediol, said (co)polyester having a melting point of about 70° C., and with an OH number from about 27 to about 34 mg KOH/g (as measured according to standard procedure DIN 53240-2).

A curable composition of the invention may further comprise from about 5 ppm to about 50 ppm of a stabiliser of the cyanoacrylate component. The stabiliser may be selected from boron trifluoride ($BF_3$) or sulfur dioxide ($SO_2$).

The invention also relates to a method of preparing a solidified mass of the curable composition of the invention comprising the steps of:
(i) mixing a TPU component with a component comprising a curable cyanoacrylate at a temperature above the melting point of said TPU component, forming a mixture,
(ii) casting the mixture of step (i) into a container of desired geometric form, for example a tubular container dimensioned to form the cast mixture into a cylindrically shaped stick, and
(iii) allowing the cast mixture of step (ii) to cool, or cooling said cast mixture, sufficiently to solidify the composition, wherein said TPU component has a mass average molar mass Mw from about 5000 to about 250000, such as from about 6000 to about 200000, suitably from about 10000 to about 150000,
wherein said TPU component is soluble at 65° C. in the curable cyanoacrylate component up to at least 40 wt % by weight based on total weight of the curable cyanoacrylate component, and
wherein said TPU component is based on a polyol that is based on at least one of a diol or a dicarboxylic acid characterised in that at least one of said diol or dicarboxylic acid has greater than 10 carbon atoms ($>C_{10}$) in the main chain, and
wherein said TPU component has a glass transition temperature, Tg, of from about −60° C. to about 0° C., and a melting point of from about 30° C. to about 100° C. as measured by differential scanning calorimetry in accordance with ISO11357, and
wherein said TPU component is mixed in step (i) with a component comprising a curable cyanoacrylate such that said TPU component is present in the solidified mass of the curable composition in an amount from about 1 wt % to about 60 wt %, wherein the weight percentages are based on the total weight of the composition, and
wherein the component comprising a curable cyanoacrylate comprises a curable cyanoacrylate selected from the group comprising ethyl cyanoacrylate, butyl cyanoacrylate, and β-methoxy cyanoacrylate.

In a method of the invention the TPU component may be present in the curable composition in an amount from about 5 wt % to about 40 wt %, for example from about 10 wt % to about 30 wt %, wherein the weight percentages are based on the total weight of the composition.

It was appreciated that in the method of the invention the TPU component may be as described above for compositions of the invention including for example wherein the TPU component comprises polyester segments.

The invention also relates to a shaped mass prepared by the method of the invention, particularly a mass shaped in a stick form.

The invention further relates to a pack comprising:
(i) a shaped mass of a curable composition according to the invention; and
(ii) a container for the composition, the container having a mechanism for expelling the shaped mass.

A curable composition of the invention is in the form of a non-flowable soft solid at 25° C.

A TPU component 'based on' a certain polyol is one in which said polyol has been used in the synthesis of said TPU component, or which forms a structural unit in said TPU component. Similarly, a polyol 'based on' diol units or dicarboxylic units is one in which said diol units or dicarboxylic acid units have been used in the synthesis of said polyol, or which form structural units in said polyol.

TPU components suitable for use in the present invention are those based on a polyol that is based on at least one diol or dicarboxylic acid characterised in that at least one of said diol or dicarboxylic acid has greater than 10 carbon atoms ($>C_{10}$) in the main chain. Following the IUPAC definition, as used herein the term "main chain" refers to that linear chain to which all other chains, long or short or both, may be regarded as being pendant. For example, in 5-methyl-1,12-dodecanedioic acid, the carbon atoms proceeding linearly from carbon 1 to carbon 12 constitute the main chain, whereas the carbon atom of the methyl group at position 5 is regarded as lying off the main chain; thus 5-methyl-1,12-dodecanedioic acid has 12 carbon atoms in the main chain. Similarly, a polyester polyol formed from a main chain-$C_4$ diol and a main chain-$C_6$ or main chain-$C_7$ dicarboxylic acid, and thus comprising repeating elements with at least ten or eleven carbon atoms (bridged by an ester linkage) respectively, would not comprise a polyol based at least one diol or dicarboxylic acid characterised in that at least one of said diol or dicarboxylic acid has greater than 10 carbon atoms ($>C_{10}$) in the main chain.

Thermoplastic polyurethanes (TPUs) suitable for use as solidifying agents in the present invention include those, for example, formed from the reaction of polyisocyanate compounds with polyols that result in TPUs with a low glass transition temperature (Tg), such as from about −50° C. to about −10° C. Glass transition temperatures (Tg) can be readily determined by techniques well known in the art, for example by differential scanning calorimetry. An example of a suitable polyol for practicing the current invention is Dynacoll 7380, which is a solid, highly crystalline, saturated copolyester of dodecanedioic acid and 1,6-hexanediol with an OH number from about 27 to about 34 mg KOH/g (as measured under standard procedure DIN 53240-2), an acid value of <2 mg KOH/g (as measured under standard procedure ISO 2114), a melting point of about 70° C. (as measured by differential scanning calorimetry), a softening point of 77° C. (measured by ring and ball instrument according to standard procedure ISO 4625), a viscosity of about 2,000 mPa·s at 80° C. (as measured using a Brookfield LVT 4 viscometer), a Tg/Tm of 0.62, and a molecular weight (from the hydroxyl value) of about 3,500.

The invention also provides an easy to use and consumer-friendly pack comprising:
(i) a shaped mass of a curable cyanoacrylate composition according to the invention (a cast composition); and,
(ii) a container for the composition, the container having a mechanism for expelling the shaped mass.
The pack may thus be sold as an article of commerce.

For example the container may have a mechanism for moving the shaped mass between a position where the shaped mass projects from the container, and a position where the shaped mass is substantially located (retracted) within the container. The composition is thus expellable. Suitably the container is a tubular container.

The curable composition may be cast directly in the container. The container may be of the type having a displaceable mechanism for example a carrier for displacing the mass of the composition relative to the container. The carrier may move the mass so that it projects from the container, or retract the mass so that it is housed within the container. In this way the mass may be extended for application to a substrate or retracted for storage. The container may comprise a cap for protection of the mass when the composition is not in use. Desirably the container has means for manual adjustment of the position of the mass or carrier, for example where the carrier is reciprocally threaded on a winding mechanism and can thus be extended or retracted by rotation of the winding mechanism in one of two directions. For example, the curable composition may be cast directly in to a tubular container such as a stick cartridge of the type typically used for adhesives such as PrittStick®, or for example, a tubular container (1) of the type shown in FIG. 6. The cast compositions of the present invention have the ease of handling advantages of completely solid materials yet they remain easily dispensable.

It will be appreciated by those skilled in the art that a multitude of suitable containers may be used with the shaped masses or sticks of the present invention. Typically used containers are those with propulsion (expelling) mechanisms to propel the stick out of the container. Many such containers are known for example for deodorants/anti-perspirants, and make-up such as lipstick etc. The stick compositions of the present invention can thus be considered "glue sticks".

DETAILED DESCRIPTION

It has been surprisingly found that after dissolving a thermoplastic polyurethane (TPU) material with a relatively low melting point (such as for example of from about 30° C. to about 100° C., for example about 58° C., or for example about 70° C.) in a curable cyanoacrylate component (such as for example ethyl cyanoacrylate, butyl cyanoacrylate, or β-methoxy cyanoacrylate), at a temperature above the melting point of said TPU, and doing so at a relatively high weight percentage based on the total weight of the composition (for example, TPU from about 20 wt % to about 40 wt %, based on the total weight of the composition), and allowing the mixture to cool, the resulting cyanoacrylate composition has a solid-form at room-temperature (25° C.). As used herein, the term solid can encompass rigid solids, crystalline solids, liquid crystalline solids, and biphasic liquid crystalline/crystalline solids, at room temperature (25° C.).

The TPUs comprised in the curable cyanoacrylate compositions of the present invention have solubility values at 65° C. of at least 40 wt % based on the weight of the curable cyanoacrylate component. By way of contrast, fumed silica (CAS No. 112945-52-5; available from Sigma-Aldrich), which is sometimes used in compositions of the art to increase the viscosity and thixotropy of an uncured cyanoacrylate composition, forms fine dispersions in liquid ethyl cyanoacrylate. If present at 40 wt %, fumed silica precipitates and agglomerates, leading to inhomogeneity (lumpiness) in the composition—on its own, no amount of fumed silica added to a curable liquid cyanoacrylate composition can convert said composition to a semi-solid curable mass of a cyanoacrylate composition. Such compositions do not have any integrity that allows them to be handled without dripping or spilling. Similarly, it is known to add polymethylmethacrylate (PMMA) to cyanoacrylates as a thickener and to increase viscosity. If PMMA is present at 40 wt % in uncured liquid ethyl cyanoacrylate at 65° C., PMMA precipitates and agglomerates, leading to inhomogeneity (lumpiness) in the composition—on its own, no amount of PMMA added to a curable liquid cyanoacrylate composition can convert said composition to a semi-solid curable mass of a cyanoacrylate composition.

Without wishing to be bound by any theorem, it is thought that TPU materials having high crystallisation rates and relatively low glass transition temperatures such as, for example, from about −50° C. to about −10° C. are the most suitable for imparting solid form to otherwise liquid-form cyanoacrylate monomers, at 25° C. It is thought that the relatively rapid crystallisation of the TPU, may advantageously promote microscale encapsulation of liquid-form curable cyanoacrylate during formulation of compositions of the present invention, such that the total composition is in the form of a non-flowable soft-solid at 25° C., while the cyanoacrylate component is maintained in a curable state.

It is disclosed that crystallisation rates of TPUs can be tested for and classified as follows: A test TPU can be finely sliced and then dissolved in ethyl cyanoacrylate at 65° C. at a weight ratio of 1:9. Dissolution can be facilitated by the use of a dissolver head operating at 1330 revolutions per minute. The solution can then be allowed to cool to room temperature (25° C.) over 24 hours. The crystallisation rate can then classified as follows: A TPU can be classified as having a "High crystallisation rate" if crystals, of any sort, are found to have been formed during said time-period. Crystal detection can be performed by any convenient suitable technique well-known in the art, for example, differential scanning calorimetry or wide angle X-ray scattering. In cases where complete solidification occurs over said time-period, the TPU used in that test can be further classified as having an "Extremely high crystallisation rate". Similarly, a TPU can be classified as having a "Low crystallisation rate", if the solution remains liquid and no crystals form within said time-period.

A TPU based on a polyol that is based on at least one of a diol or a dicarboxylic acid characterised in that at least one of said diol or dicarboxylic acid has greater than 10 carbon atoms ($>C_{10}$) in the main chain, is suitable for use in compositions of the present invention. (Co)Polyester polyols can be synthesised from at least one diol and at least one dicarboxylic acid. By a 'greater than $C_{10}$ dicarboxylic acid' is meant a dicarboxylic with more than 10 carbon atoms in the main chain, as such terms would be understood by someone of ordinary skill in the art. For example, dodecanedioc acid has 12 carbon atoms in the main chain and is thus an example of a greater than $C_{10}$ dicarboxylic acid. By a 'greater than $C_{10}$ diol' is meant a diol with more than 10 carbon atoms in the main chain. For example dodecanediol has 12 carbon atoms in the main chain and is thus an example of a greater than $C_{10}$ diol.

As used herein the phrase 'TPU-negative' refers to a composition that does not comprise a TPU component; for example, the TPU-negative comparative compositions in FIGS. 1-5 termed '401', '454', '60 sec.', and 'SuperTape'. As used herein, 'SuperTape' refers to a tape comprising stabilised 50 wt % phenyl ethyl cyanoacrylate and Levamelt® 900; Levamelt® 900 is a copolymer of polyethylene and polyvinyl acetate with a vinylacetate content of about 90 wt % commercially available from Lanxess AG, Leverkusen, Germany. As used herein the phrase 'stabiliser', or 'Lewis acid stabiliser' refers to a substance that stabilises the curable cyanoacrylate component, for example by inhibiting premature polymerisation of the cyanoacrylate. As used herein, "Stabiliser Solution" specifically refers to a freshly prepared stock solution of curable ECA comprising boron trifluoride ($BF_3$) at 1000 parts per million (ppm). Said Stabiliser Solution can be used to adjust to a desired final concentration of $BF_3$ Lewis acid stabiliser in a curable cyanoacrylate composition; for example a final concentration of 50 ppm $BF_3$, or for example a final concentration of 20 ppm $BF_3$. The skilled person will readily appreciate that other suitable stabilisers, for example another suitable Lewis acid, or for example the stabiliser $SO_2$, could be used to stabilise the curable cyanoacrylate component. It is disclosed that similar stabiliser solutions can be prepared using β-methoxy cyanoacrylate, or butyl cyanoacrylate as the carrier for the stabiliser, said stabiliser solutions being suitable for adjusting the amount of stabiliser in curable compositions based on β-methoxy cyanoacrylate, or butyl cyanoacrylate respectively.

Formulation of the compositions and products of the present invention can be achieved by mixing the TPU component into the curable liquid cyanoacrylate component at elevated temperature. Desirably, these components are mixed at about 1000 rpm under elevated temperature conditions, for example, 50° C. to 65° C. The TPU may then be added, while maintaining the temperature at about 50° C. to 65° C. Or, the TPU material may, optionally, be preheated above its melting point before its addition to the curable cyanoacrylate component. The actual temperature used may vary depending upon the melting point of the particular TPU or its solubility in the curable cyanoacrylate component. Mixing is performed for a time sufficient dissolve the TPU component into the cyanoacrylate component, which time can vary depending on the batch size. Generally, only seconds (s) or minutes (mins) are required to achieve the desired blending in of the TPU component. The curable composition will thus become thickened upon returning to room temperature (25° C.) and will be a non-flowable soft solid. The so-formed composition may then be dispensed into a dispensing container, such as a lipstick-type dispenser, or a type similar to that used for PrittStick™, while hot (FIG. 6(A) and (B)). The composition is then allowed to cool, or is cooled in a controlled manner, to create a soft-solid curable cyanoacrylate composition of the present invention.

BRIEF DESCRIPTION OF THE DRAWINGS

Embodiments of the invention will be described, by way of example only, with reference to the accompanying drawings in which:

FIG. 6(A) [side view] and FIG. 6(B) [end view] depict a container suitable for holding A curable composition of the present invention, for example a shaped soft solid or semi-solid mass, the container having a mechanism for expelling the shaped mass.

DETAILED DESCRIPTION OF THE DRAWINGS

Figure 1:
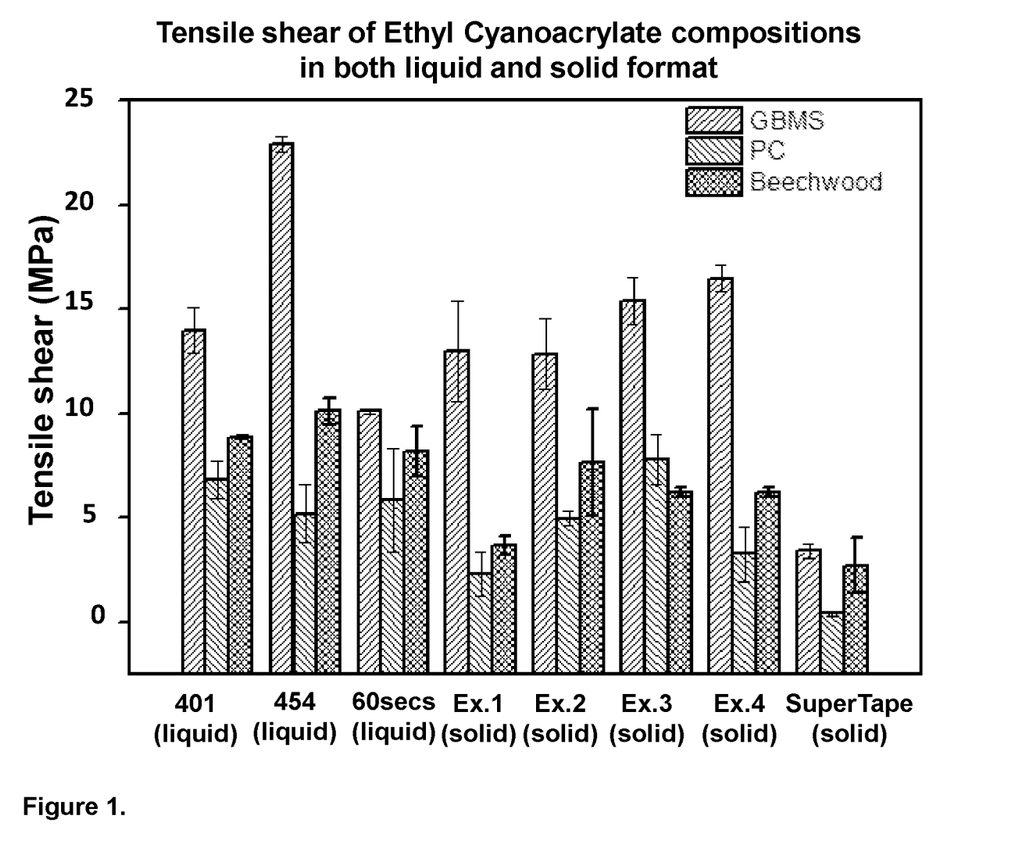
FIG. 1 depicts the results of tensile shear tests on several substrates (GBMS, PC, Beechwood) using example soft solid form ethyl cyanoacrylate compositions according to the present invention, and provides results of comparative TPU-negative liquid form and solid form ethyl cyanoacrylate compositions. Tensile shear tests were performed using a lap-shear based test in accordance with ISO 4587.

FIG. 1 depicts bar charts showing the results of tensile shear tests obtained using unmelted soft solid form ethyl cyanoacrylate example compositions: Example 1 ('Ex.1'), Example 2 ('Ex.2'), Example 3 ('Ex.3'), and Example 4 ('Ex.4'). Results are also shown for commercially available liquid and solid form cyanoacrylate compositions that were included in the tests as TPU-negative comparative compositions. Said TPU-negative comparative compositions are LOCTITE 401 ('401', liquid), LOCTITE 454 ('454', liquid), LOCTITE 60 sec. ('60 secs', liquid), and SuperTape ('SuperTape', solid). Tensile shear is reported in MPa, and results were obtained in lap shear tests performed according to ISO 4587. The tensile shear strength was measured on following substrates: Grit blasted mild steel (GBMS), polycarbonate (PC), and beechwood.

Figure 2:
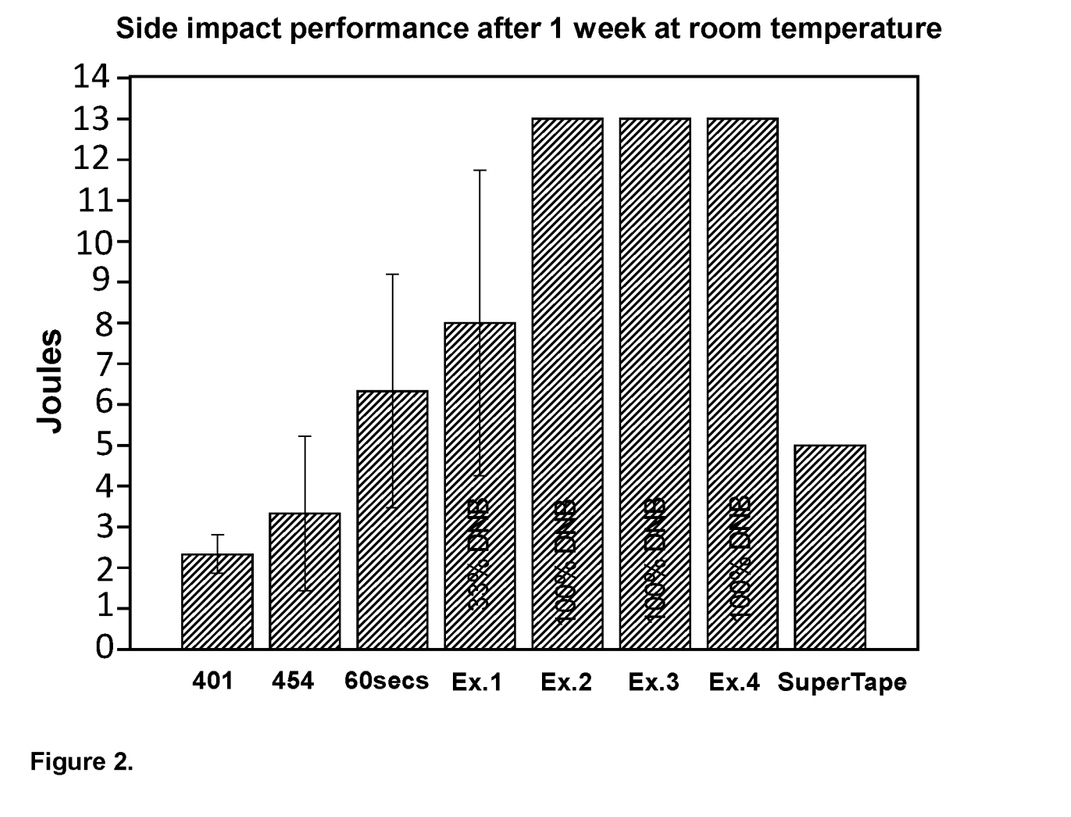
FIG. 2 depicts the results of side impact tests obtained using example soft-solid form ethyl cyanoacrylate compositions of the present invention when said tests were performed following 1 week of cure at room-temperature (25° C.).

FIG. 2 depicts bar charts showing the results of side impacts tests performed after 1 week at room temperature (25° C.) in accordance with standard procedure GM9751P for soft solid form ethyl cyanoacrylate compositions Example 1 ('Ex.1'), Example 2 ('Ex.2'), Example 3 ('Ex.3'), and Example 4 ('Ex.4'), and for the comparative TPU-negative compositions: 401, 454, 60 secs, and SuperTape. As seen for Example 1, Example 2, Example 3, and Example 4, in a certain number of tests no breakage was observed; '% DNB' in FIG. 2 and FIG. 3 refers to how often the tested compositions did not break during side impacts, expressed as a percentage of the total number of tests performed.

Figure 3:
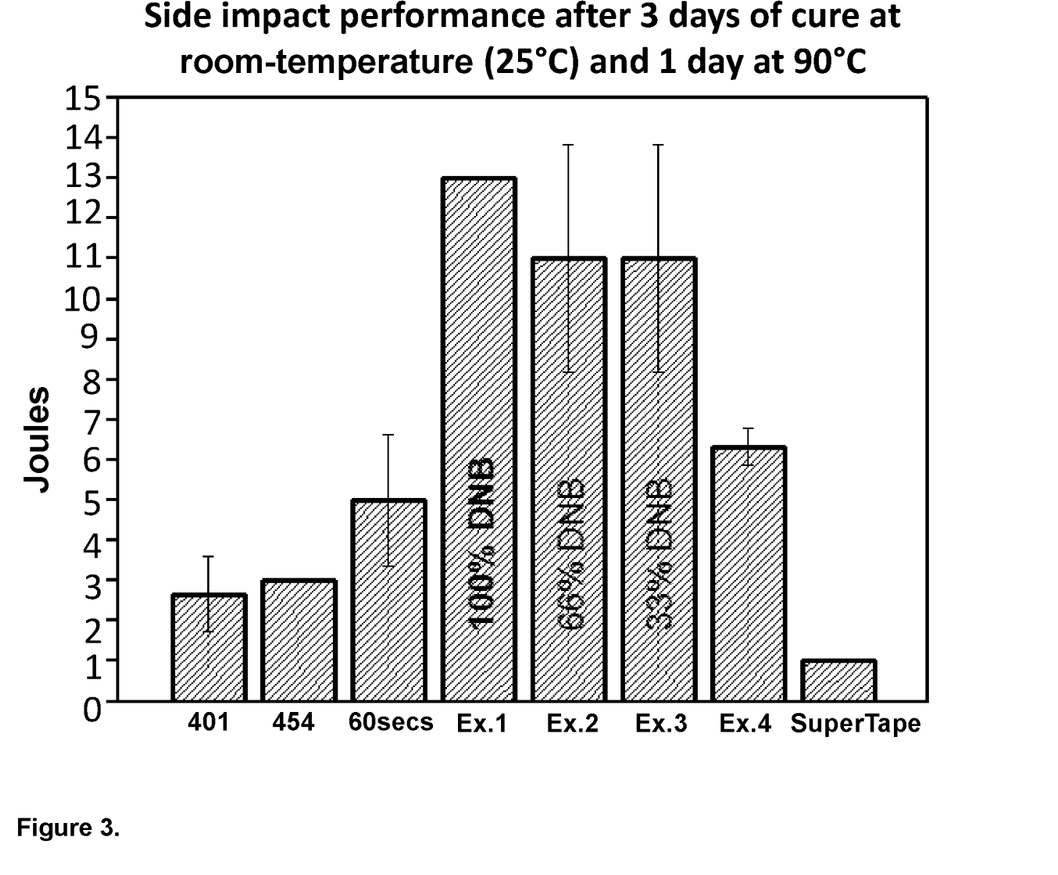
FIG. 3 depicts the results of side impact tests obtained using example soft solid form ethyl cyanoacrylate compositions of the present invention when said tests were performed following 3 days of cure at room-temperature (25° C.) and 1 day at 90° C.

FIG. 3 depicts bar charts showing the results of side impacts tests performed after 3 days cure at room (25° C.) followed by one day cure at 90° C. in accordance with standard procedure GM9751P for soft solid form ethyl cyanoacrylate compositions Example 1 ('Ex.1'), Example 2 ('Ex.2'), Example 3 ('Ex.3'), and Example 4 ('Ex.4'), and for the comparative TPU-negative compositions: 401, 454, 60 secs, and SuperTape.

Figure 4:
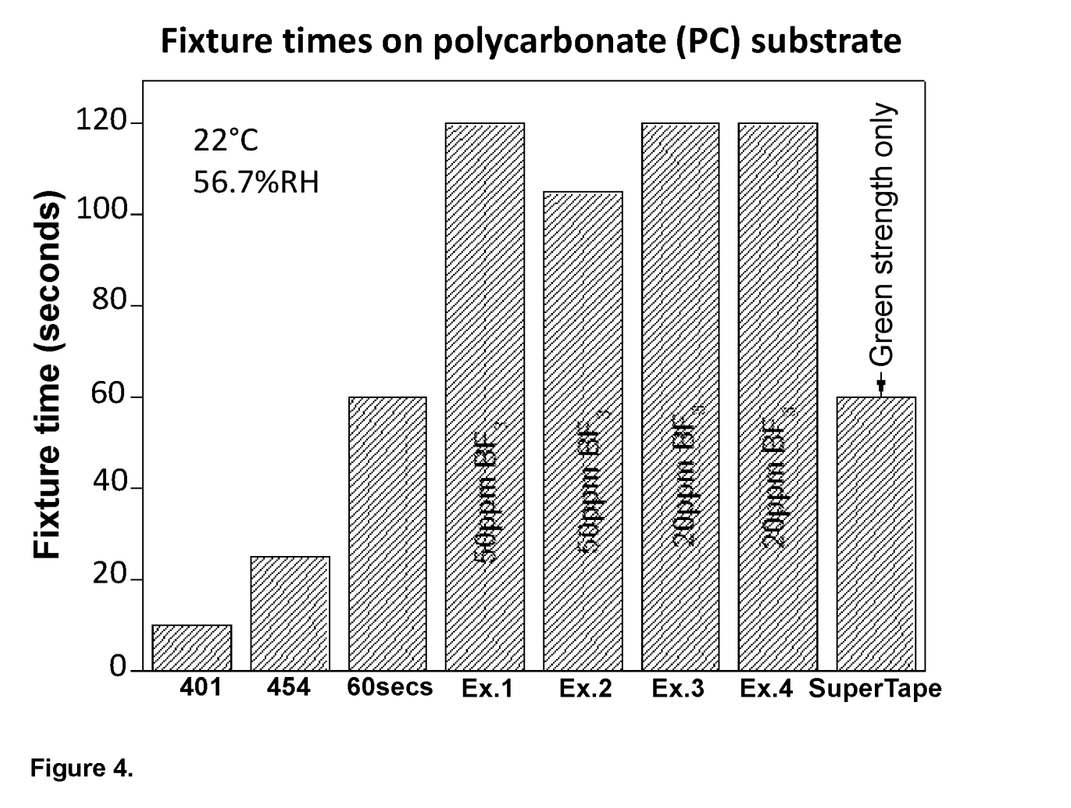
FIG. 4 depicts the results of fixture time tests obtained (22.2° C., 56.7% relative humidity) using example soft solid form ethyl cyanoacrylate compositions of the present invention when said tests were performed using polycarbonate as a substrate.

FIG. 4 depicts bar charts showing the results of fixture time tests on polycarbonate (PC) substrates for soft solid form ethyl cyanoacrylate compositions Example 1 ('Ex.1'), Example 2 ('Ex.2'), Example 3 ('Ex.3'), and Example 4 ('Ex.4'), and for the comparative TPU-negative compositions: 401, 454, 60 secs, and SuperTape (green strength only for SuperTape). The fixture time tests were performed at 22.2° C. and 56.7% relative humidity (RH). Fixture times were recorded in seconds. Fixture times were determined by stressing a single adhesive overlap joint with the application of a 3 kg tensile force parallel to the bond area and to the major axis of the PC test lap shear specimens. Clearly, fixture time will be modulated in part by the amount of stabiliser present; relevant to the fixture time results as depicted, Example 1 and Example 2 were formulated with 50 parts-per-million (ppm) of the stabiliser boron trifluoride ($BF_3$), whereas Example 3, and Example 4 were formulated with 20 ppm $BF_3$.

Figure 5:
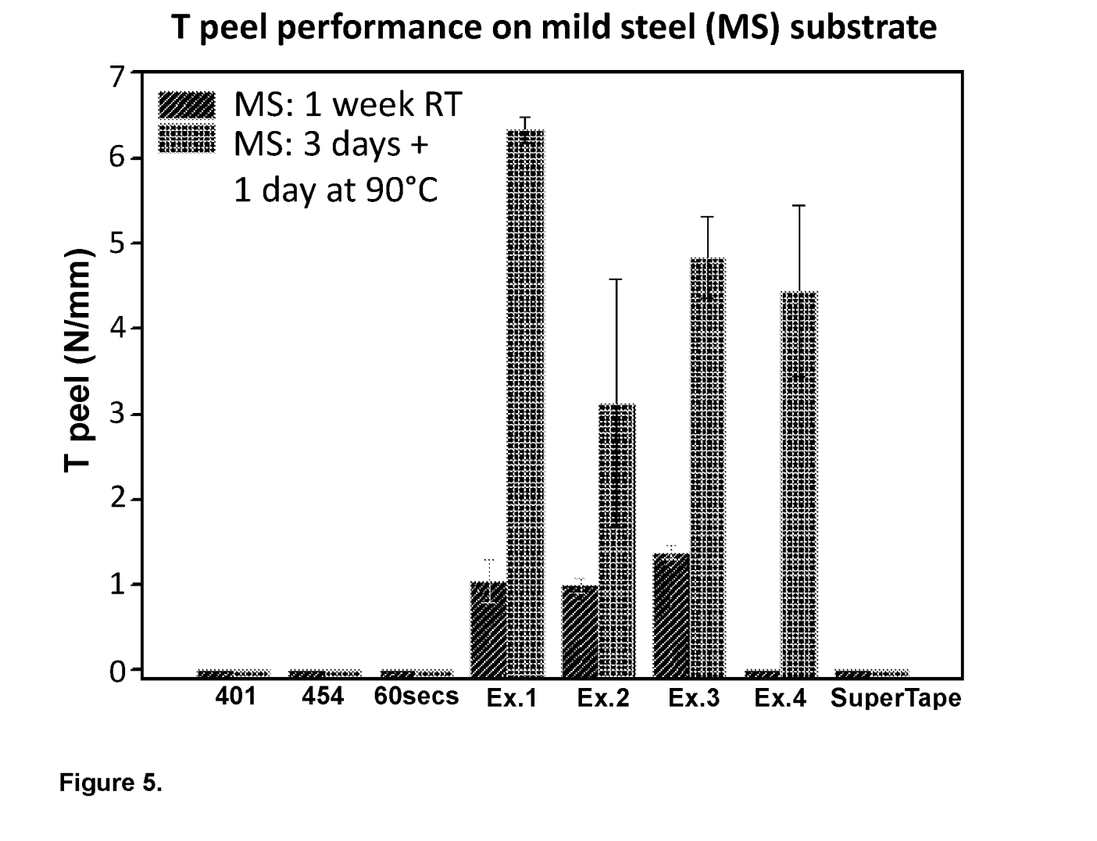
FIG. 5 depicts the results of T-peel tests obtained using example soft solid form ethyl cyanoacrylate compositions of the present invention when said tests were performed on a substrate of mild steel, following cure at either 1 week at room temperature (25° C.), or 3 days at room-temperature followed by 1 day at 90° C.

FIG. 5 depicts bar charts showing the results of T-peel tests for soft solid form ethyl cyanoacrylate compositions Example 1 ('Ex.1'), Example 2 ('Ex.2'), Example 3 ('Ex.3'), and Example 4 ('Ex.4'), and for the comparative TPU-negative compositions: 401, 454, 60 secs, and SuperTape, as measured according to ASTM D903-04, on a mild steel (MS) substrate. The bar charts show results for compositions cured for 1 week at room temperature (25° C.) prior to testing, and for compositions cured for 3 days at room temperature (25° C.) followed by heating the coupons used in the test to 90° C. for 1 day (24 hours) prior to testing. Said coupons were prepared according to Federal Specification QQ-S-698.

FIG. 6(A) shows a side view of a container 1 suitable for holding a curable composition of the present invention. The container is tubular being cylindrical in cross-section having cylindrical side walls 2. On the base of the container is a knurled wheel 3 which forms part of a propulsion mechanism for a (soft-solid or semi-solid) mass or stick 4 of the curable cyanoacrylate composition of the present invention. The mass 4 has been cast in a generally cylindrical shape. The container 10 further comprises a cap 5 which is snap-fit engageable over the top end 6 of the container 1 to protect the mass 4 of product. The top end 6 is of lesser diameter than the side walls 2 and has a rim 7 which engages in a corresponding recess on the underside of the cap 5 to secure the cap 5 in place. The knurled wheel 3 is attached to an elongate drive or winding shaft 8 which is centrally located within the housing formed by the side walls of the container. On the winding shaft 8 is located a moveable carrier 9. The carrier 9 is generally cylindrical (from an end view thereof, see for example FIG. 6(B)) and has a short peripheral upstanding wall 10 formed on its base 11. During the casting process the carrier 9 is positioned to secure itself to the lower end 12 of the mass 4 on solidification of the mass 4. Indeed the mass 4 may be cast also with the shaft 8 (and optionally the wheel 3) in place. The mass 4 can be considered to be in stick-form as that term is used in herein.

As best seen from FIG. 6(B) the carrier 9 has a central threaded aperture 13 in which the threads 16 of the shaft 8 engage. The knurled wheel 3 and the shaft 8 are both mounted for relative rotation to the container body. When the wheel 3 is turned in the direction of the arrow it moves the carrier up or down the shaft 8 thus controlling the relative position of the mass and the container. In the position shown the carrier has travelled part way up the shaft, moving the mass to a position where it protrudes from the container. The mass can then be applied by rubbing against a substrate by manual force. Sufficient shearing of the mass takes place to allow it to rub off onto the substrate. No separate applicator/brush etc. is necessary. The composition can be applied with manual pressure.

To prevent rotation of the carrier 9 with the shaft, elongate ribs 14 are provided on opposing sides of the internal wall of the container. The ribs 14 run from the base of the container to a position proximate to the mouth of the container. The ribs 14 each engage one of corresponding grooves 15 in the carrier 9 thus preventing relative rotation of the container and the carrier and ensuring that the carrier moves upwardly or downwardly when the shaft 8 turns. The carrier 9 and the mass 4 can be retracted by rotation of the wheel 3 in an opposing direction.

EXAMPLES

Synthesis of Example Thermoplastic Polyurethanes, Suitable for Practising the Present Invention Example TPU composition, 'Example TPU-A' was prepared as follows: Into a three necked resin kettle vessel was placed 370.33 g of polyol Dynacoll 7380 (Evonik), along with 2.15 g of Irganox 1010 (Ciba) antioxidant. Irganox is a registered trademark; Irganox 1010 is pentaerythritol tetrakis(3-(3,5-di-tert-butyl-4-hydroxyphenyl)propionate). A 1-3 mbar vacuum was then applied to the vessel. The Dynacoll 7380 polyol, having a melting point of 70° C. and described as a solid highly crystalline saturated co-polyester, was melted at between 110-120° C. Melting under vacuum increases the efficiency of the degassing and moisture-removal procedure, while also reducing the possibility of depletion of the polyol due to deposition on the side walls of the vessel. Once melted (~30-40 mins), the polyol was stirred for 30 mins at 100 revolutions-per-minute (rpm) under vacuum, allowing for further removal of unwanted moisture. The vacuum was then removed by introducing a slight flow of dinitrogen gas ($N_2$). A 47.59 g flake of the isocyanate compound MDI was added through a wide-necked funnel, starting the reaction. The vessel was stoppered and the $N_2$ flow removed. The reaction was maintained at 115° C. and the stirrer speed was increased to 250 rpm for 15 mins without vacuum. After this time the reaction vessel was again placed under vacuum (1-3 mbar) for 15 mins. Then, as a quality control step to ensure the reproducibility of the $M_w$ distributions, the vacuum was removed again and three 1 g samples were taken from the vessel to correctly determine the remaining amount of unreacted isocyanate groups using triplicate titrations. The vessel was then stoppered and placed under vacuum again, with continuous stirring for a further 30 mins. The vacuum was then removed by introducing a slight flow of $N_2$ gas. The chain extender, in this case 1,4-butanediol, was now added (9.94 g) to the vessel under $N_2$ via a dropping funnel to ensure full delivery. Once all of the 1,4-butanediol had been added to the vessel, the vessel was stoppered and the mixing speed was maintained at 250 rpm. The reaction proceeded for 15 mins without vacuum, and fora further 15 mins under vacuum; during this stage, the reaction, which is exothermic, was allowed to proceed at a temperature of 115° C., while ensuring that the temperature did not exceed 125° C. The TPU prepared this way is termed 'Example TPU-A'. At the end of this time, the TPU that had formed was collected by filtration, and allowed to cool to room temperature. The glass transition temperature (Tg) of Example TPU-A is −32.3° C., and its melting point is 57.4° C., as determined by differential scanning calorimetry.

The TPU was finely cut into small pieces and then rapidly mixed with the ethyl cyanoacrylate (comprising a desired final concentration of stabiliser), at 65° C., in the weight-percentages listed in the Table 3 ('Example compositions of the present invention'). Once the mixture had been allowed to cool back down to room-temperature, a solid composition was obtained which is an embodiment of the current invention. The rate of cooling depends on several factors such as the $M_w$ and crystallisation rate of the TPU. For example, and without any intention of limiting the invention, the cooling rate can be from about 65° C. to room-temperature (25° C.) in 30 mins. Differential scanning calorimetry can be used to determine solidification rate and melting temperature, for example the solidification rate and melting temperature of a TPU, according to standard procedure ISO 11357.
A similar TPU ('Example TPU-B'), differing compositionally only in the weight percentages of the relevant components, was also prepared according to an identical method (Table 2). The glass transition temperature (Tg) of Example TPU-B is −35.7° C., and its melting point is 52.2° C., as determined by differential scanning calorimetry. Tables 1-3 provided below summarise the TPU compositions, and detail formulations of cyanoacrylate compositions comprising said Example TPUs. Freshly prepared stock Stabiliser Solution is used to mix in $BF_3$ (a stabiliser of the curable cyanoacrylate component) to a pure ECA component of the formulations (forming thereby a 'stabilised ECA component'), prior to the addition of the given TPU, to ensure that the desired final concentration of stabiliser can be conveniently achieved (for example, 50 ppm $BF_3$, or for example, 20 ppm $BF_3$). Stabiliser Solution comprises curable ethyl cyanoacrylate (ECA); therefore the total amount of curable ethyl cyanoacrylate (ECA) reported the Example Compositions described in Table 3 includes the contribution from both the pure ECA solution and the Stabiliser Solution. By way of example, the composition Example 1 comprises a stabiliser, $BF_3$, at a final concentration of 50 ppm by weight, said $BF_3$ content being adjusted/determined by the addition of Stabiliser Solution; accordingly composition Example 1 comprises a total of 89.995 wt % ECA (ECA from the initially pure ECA solution and yet further ECA from the stock Stabiliser Solution comprising 1000 ppm $BF_3$), wherein the wt %'s are based on the total weight of the composition.

TABLE 1

| Components used for synthesis of TPU-A | Mass (g) | Percentage by weight |
| --- | --- | --- |
| Dynacoll 7380 (polyol) | 370.33 | 86.12 |
| MDI | 47.59 | 11.07 |
| 1,4-Butanediol | 9.94 | 2.31 |
| Irganox 1010 | 2.15 | 0.50 |
| Total | 430.01 | 100 |

TABLE 2

| Components used for synthesis of TPU-B | Mass (g) | Percentage by weight |
| --- | --- | --- |
| Dynacoll 7380 (polyol) | 370.03 | 85.99 |
| MDI | 47.55 | 11.05 |
| 1,4-Butanediol | 10.27 | 2.39 |
| Irganox 1010 | 2.15 | 0.50 |
| Total | 430.00 | 100 |

TABLE 3

Example Compositions of the present invention
Example Compositions

| Component | Example 1 | Example 2 | Example 3 | Example 4 |
| --- | --- | --- | --- | --- |
| Total Ethyl cyanoacrylate (ECA) | 89.995 wt % | 89.995 wt % | 84.998 wt % | 84.998 wt % |
| Boron trifluoride ($BF_3$); [From fresh stock Stabiliser Solution comprising 1000 ppm $BF_3$ in ECA] | 0.005 wt % That is: a final concentration of 50 ppm | 0.005 wt % That is: a final concentration of 50 ppm | 0.002 wt % That is: a final concentration of 20 ppm | 0.002 wt % That is: a final concentration of 20 ppm |

TABLE 3-continued

Example Compositions of the present invention
Example Compositions

| Component | Example 1 | Example 2 | Example 3 | Example 4 |
|---|---|---|---|---|
| Example TPU-A | 10.0 wt % | — | — | 15.0 wt % |
| Example TPU-B | — | 10.0 wt % | 15.0 wt % | — |
| Physical form at 25° C. | Two phase liquid/crystalline; non-flowable soft solid (stick) | Two phase liquid/crystalline; non-flowable soft solid (stick) | Two phase liquid/crystalline; non-flowable soft solid (stick) | Soft solid, non-flowable (stick) |

By way of example, and with no intention of limiting the invention, the following compositions are embodiments of the invention.

Formulation of Composition Example 1

Figure 6:
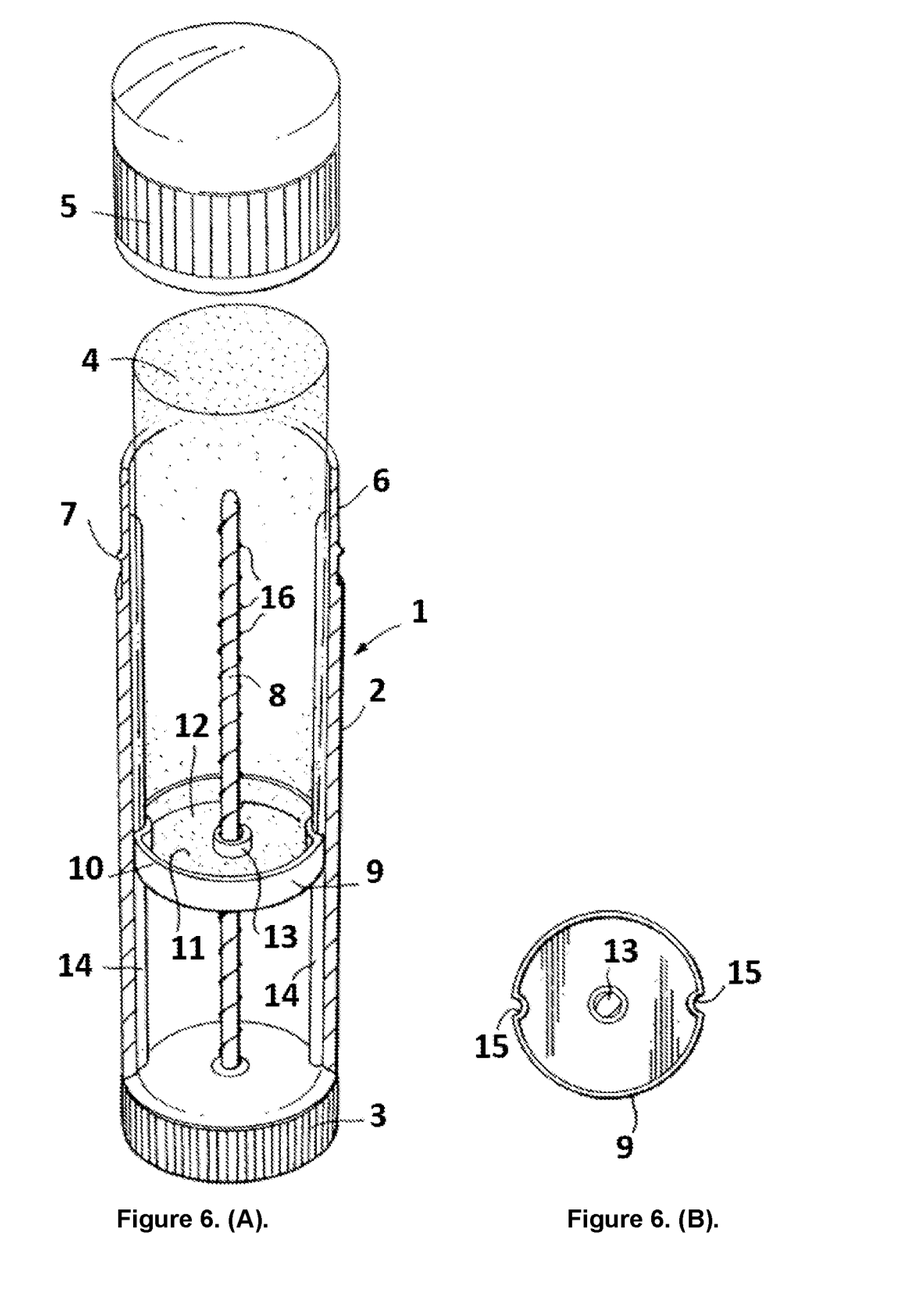

A composition was formulated to comprise a total of 89.995 wt % curable ethyl cyanoacrylate, 0.005 wt % of the stabiliser $BF_3$ (i.e. 50 ppm by weight), and then 10 wt % of Example TPU-A, wherein the weight-percentages (wt %) are based on the total weight of the composition. Stabiliser Solution (1000 ppm $BF_3$ in ECA) was used to adjust the amount of $BF_3$ in the curable ethyl cyanoacrylate component to the desired concentration of 50 ppm (forming a stabilised ECA component); then, the Example TPU-A was finely sliced and rapidly mixed with the stabilised ECA component at 65° C. for a time sufficient dissolve the TPU component (melting point=57.4° C.) into the stabilised ECA component. The resulting composition was cast directly in to a tubular stick cartridge of the type shown in FIG. 6(A, B), and as described in the description of FIG. 6, and allowed to cool to 25° C. The resulting curable cyanoacrylate composition, Example 1, was a non-flowable soft solid in stick-form at 25° C.

Formulation of Composition Example 2

A composition was formulated to comprise a total of 89.995 wt % curable ethyl cyanoacrylate, 0.005 wt % of the stabiliser $BF_3$ (i.e. 50 ppm by weight), and then 10 wt % of Example TPU-B, wherein the weight-percentages (wt %) are based on the total weight of the composition. Stabiliser Solution (1000 ppm $BF_3$ in ECA) was used to adjust the amount of $BF_3$ in the curable ethyl cyanoacrylate component to the desired concentration of 50 ppm (forming a stabilised ECA component); then, the Example TPU-B was finely sliced and rapidly mixed with the stabilised ECA component at 65° C. for a time sufficient dissolve the TPU component (melting point=52.2° C.) into the stabilised ECA component. The resulting composition was cast directly in to a tubular stick cartridge of the type shown in FIG. 6(A, B), and as described in the description of FIG. 6, and allowed to cool to 25° C. The resulting curable cyanoacrylate composition, Example 2, was a non-flowable soft solid in stick-form at 25° C.

Formulation of Composition Example 3

A composition was formulated to comprise a total of 84.998 wt % ethyl cyanoacrylate, 0.002 wt % of the stabiliser $BF_3$ (i.e. 20 ppm by weight), and then 15 wt % of Example TPU-B, wherein the weight-percentages (wt %) are based on the total weight of the composition. Stabiliser Solution (1000 ppm $BF_3$ in ECA) was used to adjust the amount of $BF_3$ in the curable ethyl cyanoacrylate component to desired concentration of 20 ppm (forming a stabilised ECA component); then, the Example TPU-B was finely sliced and rapidly mixed with the stabilised ECA component at 65° C. for a time sufficient dissolve the TPU component (melting point=52.2° C.) into the stabilised ECA component. The resulting composition was cast directly in to a tubular stick cartridge of the type shown in FIG. 6(A, B), and as described in the description of FIG. 6, and allowed to cool to 25° C. The resulting curable cyanoacrylate composition, Example 3, was a non-flowable soft solid in stick-form at 25° C.

Formulation of Composition Example 4

A composition was formulated to comprise a total of 84.998 wt % ethyl cyanoacrylate, 0.002 wt % of the stabiliser $BF_3$ (i.e. 20 ppm by weight), and then 15 wt % of Example TPU-A, wherein the weight-percentages (wt %) are based on the total weight of the composition. Stabiliser Solution (1000 ppm $BF_3$ in ECA) was used to adjust the amount of $BF_3$ in the curable ethyl cyanoacrylate component to the desired concentration of 20 ppm (forming a stabilised ECA component); then, the Example TPU-A was finely sliced and rapidly mixed with the stabilised ECA component at 65° C. for a time sufficient dissolve the TPU component (melting point=57.4° C.) into the stabilised ECA component. The resulting composition was cast directly in to a tubular stick cartridge of the type shown in FIG. 6(A, B), and as described in the description of FIG. 6, and allowed to cool to 25° C. The resulting curable cyanoacrylate composition, Example 4, was a non-flowable soft solid in stick-form at 25° C.

Soft-solid stick-form ethyl cyanoacrylate compositions Examples 1-4, formulated as described, were subject to a range of comparative tests versus commercially available ethyl cyanoacrylate control compositions containing no TPU (i.e. TPU-negative compositions): LOCTITE 401 (401; liquid form), LOCTITE 454 (454; liquid form), LOCTITE 60 Sec. glue (60 secs; liquid form), and solid-form Super Tape (FIGS. 1-5). LOCTITE and Super Tape are registered trademarks.

The tensile shear performance of compositions Example 1, Example 2, Example 3, and Example 4 was compared against the control compositions on three substrates: Grit-blasted Mild Steel (GBMS), Polycarbonate (PC), and Beechwood (See FIG. 1). The overall performance of the compositions Example 1, Example 2, Example 3, and Example 4 was comparable to that of the liquid form TPU-negative compositions (401, 454, 60 secs), and exhibited improved performance on these substrates over the solid format Super Tape control. The greatest tensile shear values measured for the compositions Example 1, Example 2, Example 3, and Example 4 were on GBMS substrate.

The side impact performance of the compositions Example 1, Example 2, Example 3, and Example 4, as measured according to standard test method GM9751P, was compared to that of the control compositions. In one set of tests the compositions were cured for 1 week at room temperature prior to side impact testing (FIG. 2), and in another set of tests the compositions were cured for 3 days at room temperature followed by 1 day at 90° C. prior to side impact testing (FIG. 3). The compositions Example 1, Example 2, Example 3, and Example 4 showed excellent impact resistance, outperforming all of the TPU-negative control compositions in both sets of tests (FIG. 2 and FIG. 3); evidencing that desirable toughening of the compositions had been achieved. When tests were performed as described for FIG. 2, in 100% of tests the compositions Example 2, Example 3 and Example 4 did not break (% DNB) following side impact; in 33% of tests the composition Example 1 did not break following side impact. When tests were performed as described for FIG. 3, in 100% of tests the composition Example 1 did not break; in 66% of tests the composition Example 2 did not break; and in 33% of tests the composition Example 3 did not break. Taken as a whole the results for these Example compositions indicate that the compositions containing TPU solidifying agents exhibit remarkable side impact resistance, representing a considerable improvement over the TPU-negative comparative compositions.

Fixture times of the compositions Example 1, Example 2, Example 3, and Example 4, were measured at 22.2° C., and a relative humidity 56.7%, by stressing a single adhesive overlap joint with the application of a 3 kg tensile force parallel to the bond area and to the major axis of the polycarbonate test lap shear specimens. Fixture time tests were performed by applying a small quantity of curable composition to the surface of one polycarbonate lap shear (time=0 s), spreading the composition evenly using a clean applicator stick so as to ensure that when the mating polycarbonate lap shear specimen was subsequently placed on top of the lap shear to which curable cyanoacrylate composition had been applied, a 323 mm$^2$ (0.5 inch$^2$) overlap bond area was completely covered. In these tests, the composition was only applied to one of the two lap shears that mate, the completed assembly resting on a flat surface. The mated lap shears were then clamped with a clamp load of 45 N using spring clamps, positioned at 6 mm (0.25 inches) from the edge of the lap, taking care to ensure the correct alignment of the lap shears. At a schedule of tested cure time intervals, in separate repeated tests, the clamps were carefully removed, the lap shear assembly was gently lifted off a surface, and a 3 kg weight block was carefully placed on the lower lap shear. Fixture was considered to have occurred if, in three consecutive tests at a given cure time interval post-application, the lap shear assembly supported the 3 kg block for at least 5 seconds. Cure time intervals assessed in these fixture time tests (relative to t=0 s) were: 5 s, 10 s, 20 s, 25 s, 30 s, 45 s, 60 s, 75 s, 90 s, 105 s, 120 s, 150 s, and 180 s. The fixture times of the compositions Example 1, Example 2, Example 3, and Example 4 were compared to those of the TPU-negative control compositions (FIG. 4). The TPU-negative control compositions all exhibit fixture times of around 60 seconds or less. In contrast, it was found that in the presence of 20-50 ppm of the Lewis acid stabiliser $BF_3$, the fixture time of the soft solid TPU-positive compositions was slower, and had been extended out to from about 100 seconds to about 120 seconds (FIG. 4).

Toughness of the compositions was assessed, in part by, performing T-peel tests on a substrate of Mild Steel (MS) according to standard test method ASTM D903-04 (FIG. 5). Coupons for use in the T-peel tests were prepared according to Federal Specification QQ-S-698. Prior to T-peel testing, said coupons of the test method were cured either for 1 week at room temperature (25° C.), or for 3 days at 25° C. followed by heating to 90° C. for 24 hours. The compositions Example 1, Example 2, and Example 3 outperformed the control compositions. The compositions Example 1, Example 2, Example 3, and Example 4 exhibited remarkably enhanced toughness when the compositions had been heat treated to 90° C. for 1 day prior to T-peel testing. Heat treatment produced no improvement in the T-peel performance of the TPU-negative comparative compositions.

Comparative Examples

Not every TPU will impart solidity to a curable cyanoacrylate composition. To illustrate this the following are comparative examples in which TPUs not according to the claims were tested for their ability to impart solidity on curable ethyl cyanoacrylate. A range of compositions were prepared by mixing uncured liquid ethyl cyanoacrylate with TPUs that are not based on polyols based on diol units with greater 10 carbon atoms in the main chain ($>C_{10}$), nor based on dicarboxylic acid units with greater 10 carbon atoms in the main chain ($>C_{10}$). Such TPUs include Pearlstick® 48-60/03 ('48-60/03'), Pearlstick® 48-60/30 ('48-60/30'), Pearlbond® DAP 893 ('DAP 893'), and Pearlbond® D1160/L ('D1169L') (commercially available from Merquinsa/Lubrizol, Carrer del Gran Vial, 17, 08160 Montmelo, Barcelona, Spain). DAP 893 is a linear polycaprolactone-copolyester thermoplastic polyurethane, while D1169L, 48-60/03, and 28-60/30 are all linear aromatic thermoplastic polyurethanes. The TPUs were finely sliced and then separately dissolved by rapid mixing at 65° C. in separate batches of ethyl cyanoacrylate. Each TPU was added at 5 wt %, 10 wt % or 15 wt % based on the total weight of the resulting TPU-ECA mixture. The mixture was allowed to cool back to room temperature (25° C.). Unlike the compositions claimed in the present invention, in no case did the addition of these particular TPUs at these comparable weight percentages (5-15 wt %) result in soft-solid form curable cyanoacrylate compositions at 25° C. All of the resulting compositions were in liquid form at 25° C., with varying viscosity, and thus could clearly not be formed as sticks. Viscosity was measured at 25° C. using a Brookfield LVT 4 viscometer. The results of these comparative tests are summarised in Table 4 below:

TABLE 4

Comparative compositions-TPUs tested to see whether they were capable of imparting solidity to ethyl cyanoacrylate at 25° C.

| TPU tested | 5 wt % TPU in ECA, Viscosity and Form | 10 wt % TPU in ECA, Viscosity and Form | 15 wt % TPU in ECA, Viscosity and Form |
|---|---|---|---|
| '48-60/03' | 206 mPa · s, Liquid | 8410 mPa · s, Liquid | 18000 mPa · s, Liquid |
| '48-60/30' | 1200 mPa · s, Liquid | 13800 mPa · s, Liquid | >20000 mPa · s, Liquid |
| 'D1160L' | 325 mPa · s, Liquid | 8970 mPa · s, Liquid | >20000 mPa · s, Liquid |
| 'DAP 893' | 19.0 mPa · s, Liquid | 126 mPa · s, Liquid | 470 mPa · s, Liquid |

These Comparative Examples strikingly demonstrate that—without foreknowledge of the claimed compositions—it is not at all trivial or straightforward to identify TPUs that can simultaneously impart solidity to curable cyanoacrylate compositions, and that are chemically compatible with the cyanoacrylate component (i.e. that do not destabilise the cyanoacrylate). Furthermore, it is not straightforward to identify such TPUs and that also do not adversely impact on T-peel shear strength.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A curable composition comprising:
(i) a cyanoacrylate component, and
(ii) a thermoplastic polyurethane (TPU) component,
wherein the TPU component (ii) has a mass average molar mass $M_w$ from about 5000 to about 250000,
and wherein said TPU component (ii) is soluble at a temperature of 65° C. in the cyanoacrylate component up to at least 40% by weight based on the total weight of the cyanoacrylate component,
and wherein said TPU component (ii) is based on a polyol that is based on at least one of a diol or a dicarboxylic acid characterised in that at least one of said diol or dicarboxylic acid has greater than 10 carbon atoms ($>C_{10}$) in the main chain,
and wherein the TPU component (ii) has a glass transition temperature of from about −60° C. to about 0° C., and a melting point of from about 30° C. to about 100° C. as measured by differential scanning calorimetry in accordance with ISO11357,
and wherein the TPU component (ii) is present in the curable composition in an amount from about 1 wt % to about 60 wt %, wherein the weight percentages are based on the total weight of the composition,
and wherein the curable cyanoacrylate component (i) is selected from the group consisting of ethyl cyanoacrylate, butyl cyanoacrylate, β-methoxy cyanoacrylate and combinations thereof,
and wherein the curable composition is solidified in a cylindrically shaped stick.

2. The curable composition according to claim 1, wherein the TPU component (ii) is present in the curable composition in an amount from about 5 wt % to about 40 wt %, wherein the weight percentages are based on the total weight of the composition.

3. The curable composition according to claim 1, wherein the TPU component (ii) has a glass transition temperature of from about −60° C. to about −5° C.

4. The curable composition according to claim 1, wherein the TPU component (ii) has a glass transition temperature of from about −55° C. to about −20° C.

5. The curable composition according to claim 1, wherein the TPU component (ii) comprises polyester segments.

6. The curable composition according to claim 1, wherein the TPU component (ii) comprises polyester segments, based on at least one of a greater than $C_{10}$ diol or a greater than $C_{10}$ dicarboxylic acid.

7. The curable composition according to claim 1 wherein the TPU component (ii) is based on a polyester polyol formed from 1,6-hexane diol and a greater than $C_{10}$ dicarboxylic acid.

8. The curable composition according to claim 1, wherein the TPU component (ii) is based on a (co)polyester of dodecanedioic acid and 1,6-hexanediol, said (co)polyester having a melting point of about 70° C., and with an OH number from about 27 to about 34 mg KOH/g (as measured according to standard procedure DIN 53240-2).

9. The curable composition according to claim 1, further comprising a stabiliser of the cyanoacrylate component.

10. The curable composition according to claim 9, wherein the stabiliser is selected from the group consisting of boron trifluoride ($BF_3$) and sulfur dioxide ($SO_2$).

11. The method of preparing a solidified mass of the curable composition according to claim 1, comprising the steps of:
(i) mixing a TPU component with a component comprising a curable cyanoacrylate at a temperature above the melting point of said TPU component, forming a mixture,
(ii) casting the mixture of step (i) into a container to form the cast mixture into a cylindrically shaped stick, and
(iii) allowing the cast mixture of step (ii) to cool, or cooling said cast mixture, sufficiently to solidify the composition,
wherein said TPU component has a mass average molar mass $M_w$ from about 5000 to about 250000,
and wherein said TPU component is soluble at a temperature of 65° C. in the curable cyanoacrylate up to at least 40% by weight based on total weight of the curable cyanoacrylate, and
wherein said TPU component is based on a polyol that is based on at least one of a diol or a dicarboxylic acid characterised in that at least one of said diol or dicarboxylic acid has greater than 10 carbon atoms ($>C_{10}$) in the main chain, and wherein said TPU component has a glass transition temperature, Tg, of from about −60° C. to about 0° C., and a melting point of from about 30° C. to about 100° C. as measured by differential scanning calorimetry in accordance with ISO11357, and wherein said TPU component is mixed in step (i) with a component comprising a curable cyanoacrylate such that said TPU component is present in the solidified mass of the curable composition in an amount from about 1 wt % to about 60 wt %, wherein the weight percentages are based on the total weight of the composition, and wherein the component comprising a curable cyanoacrylate comprises a curable cyanoacrylate selected from the group consisting of ethyl cyanoacrylate, butyl cyanoacrylate, and β-methoxy cyanoacrylate.

12. The method as claimed in claim 11, wherein the TPU component is present in the curable composition in an amount from about 5 wt % to about 40 wt %, wherein the weight percentages are based on the total weight of the composition.

13. The method as claimed in claim 11 wherein the TPU component comprises polyester segments.

14. A mass shaped in a stick form prepared by the method of claim 11.

15. A pack comprising:
   (i) a shaped mass of a curable composition according to claim 1; and
   (ii) a container for the composition, the container having a mechanism for expelling the shaped mass.

* * * * *

UNITED STATES PATENT AND TRADEMARK OFFICE
CERTIFICATE OF CORRECTION

| | | |
|---|---|---|
| PATENT NO. | : 11,066,507 B2 | Page 1 of 1 |
| APPLICATION NO. | : 16/841530 | |
| DATED | : July 20, 2021 | |
| INVENTOR(S) | : Rory B. Barnes et al. | |

It is certified that error appears in the above-identified patent and that said Letters Patent is hereby corrected as shown below:

In the Specification

Column 11, Line 20 change "fora" to --for a--.

Signed and Sealed this
Ninth Day of August, 2022

Katherine Kelly Vidal
*Director of the United States Patent and Trademark Office*